Aug. 21, 1956    C. F. ABRESCH    2,759,347
DOMESTIC APPLIANCE
Filed Dec. 23, 1950    6 Sheets-Sheet 3
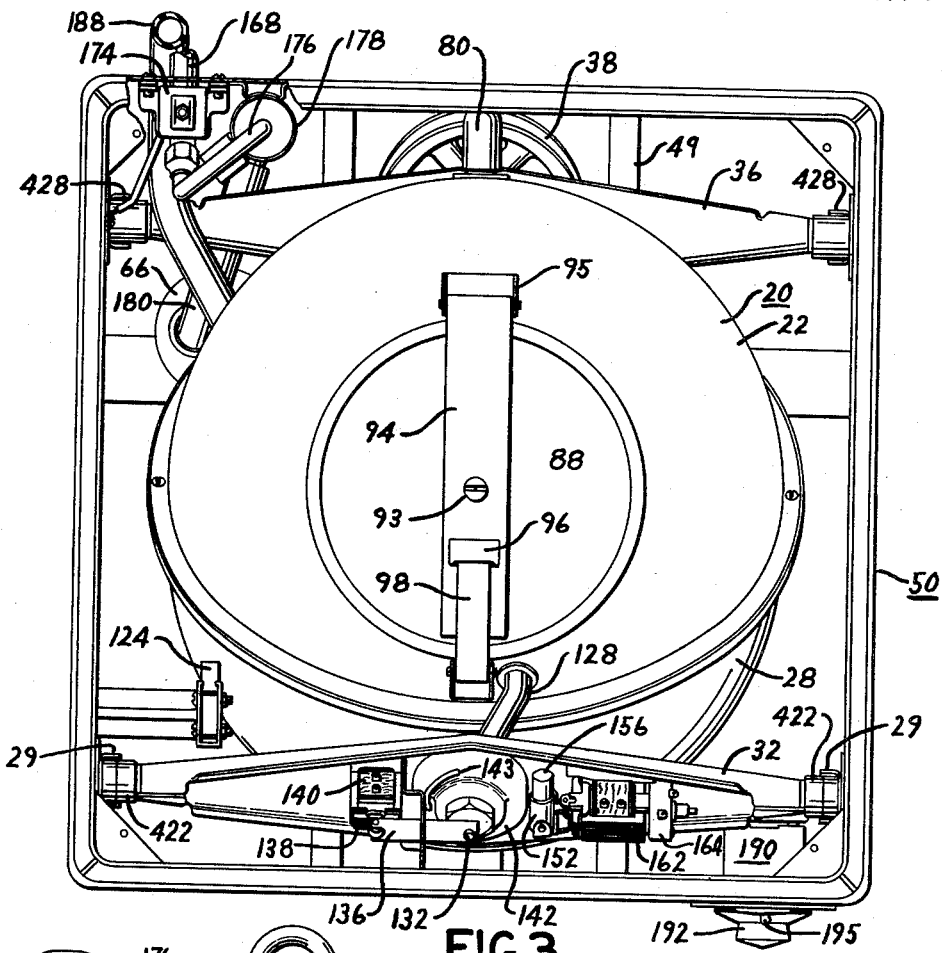
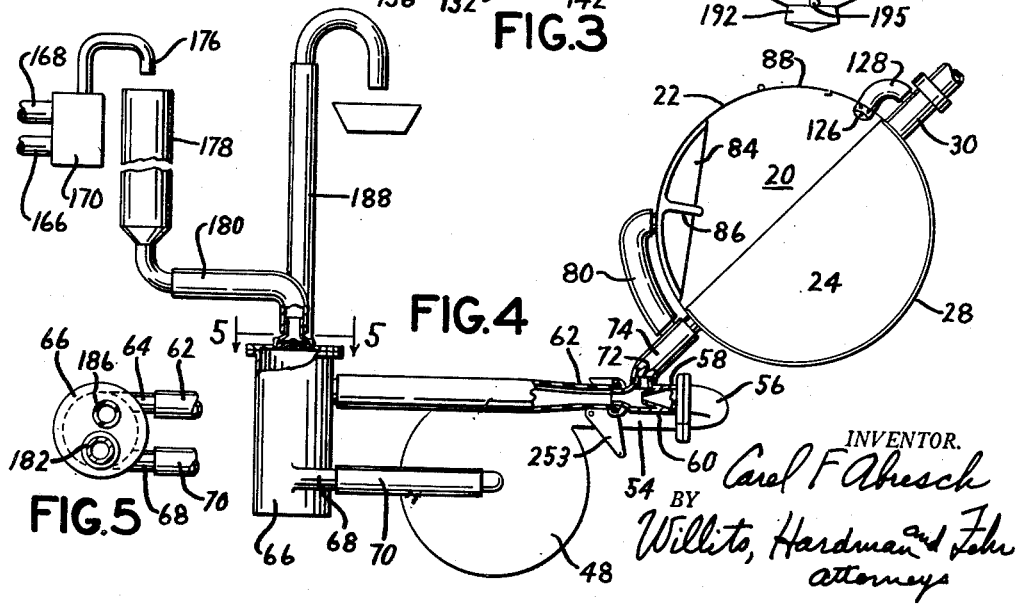

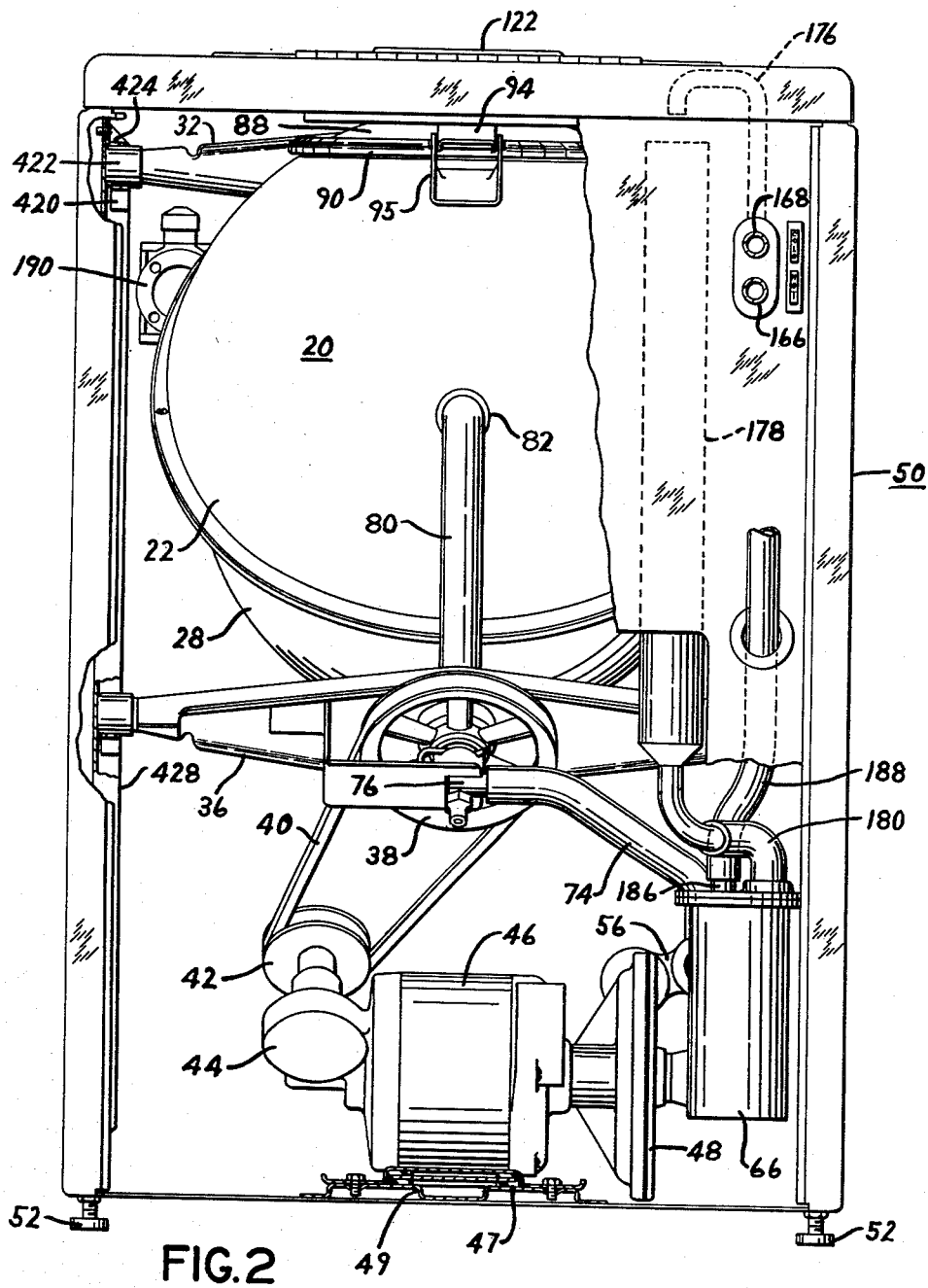

Aug. 21, 1956  C. F. ABRESCH  2,759,347
DOMESTIC APPLIANCE
Filed Dec. 23, 1950  6 Sheets-Sheet 4
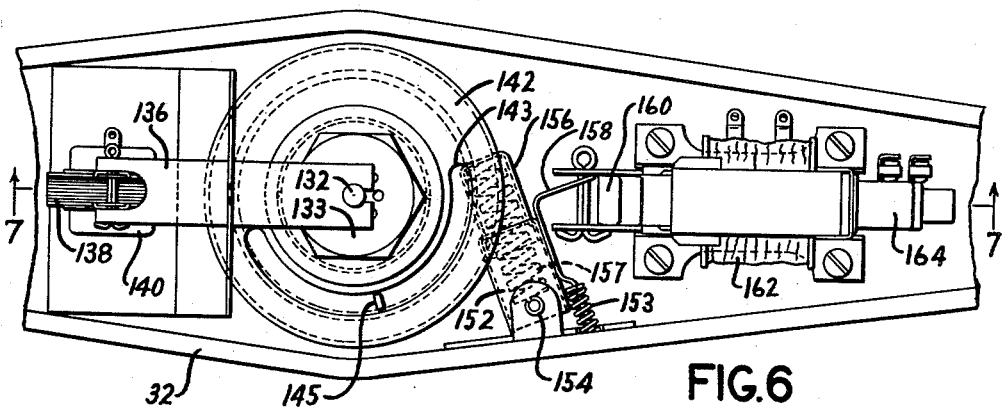
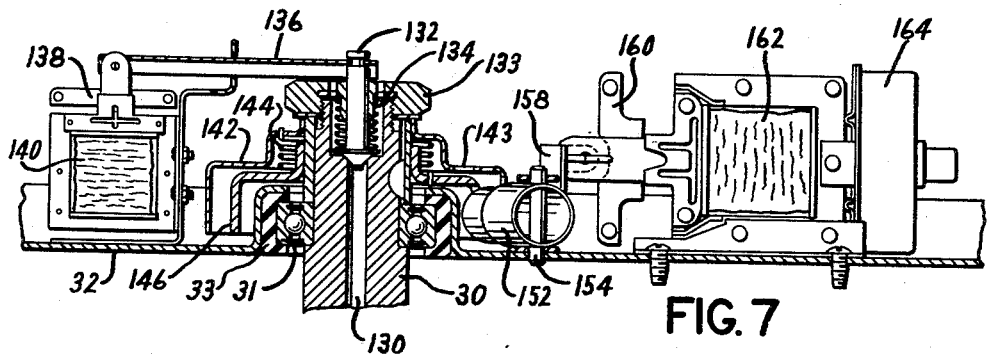
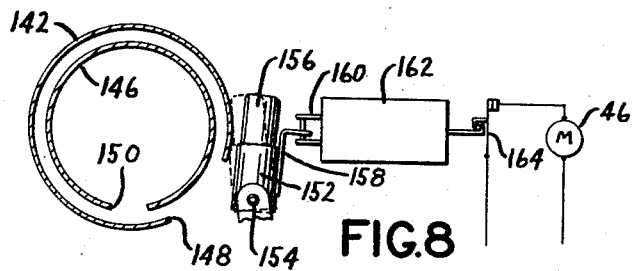
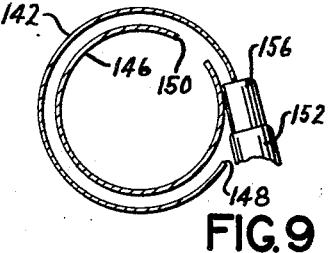
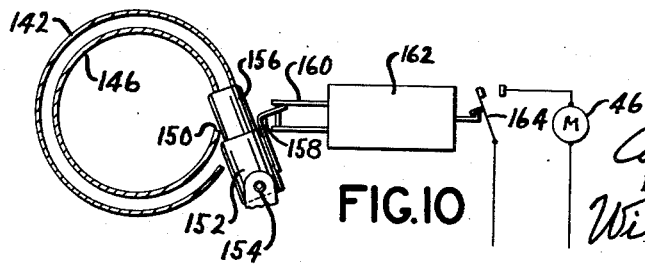
INVENTOR
Carl F. Abresch
BY
Willits Hardman and Fehr
Attorneys

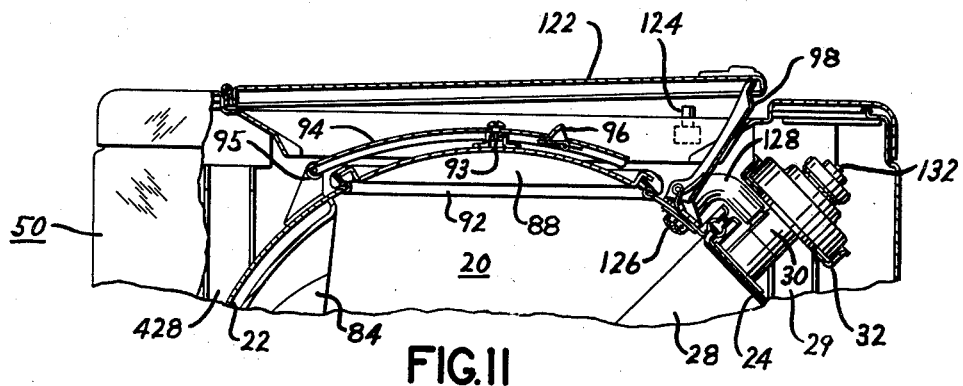
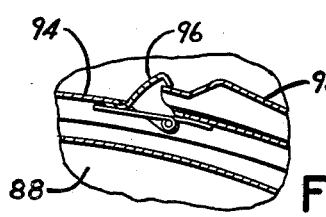
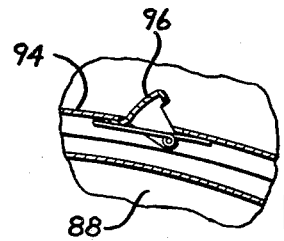
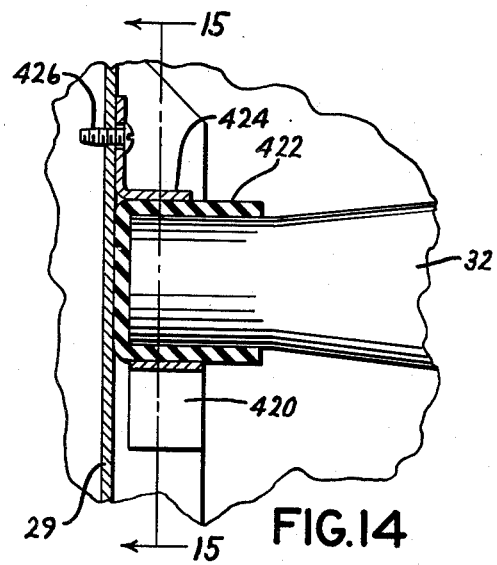
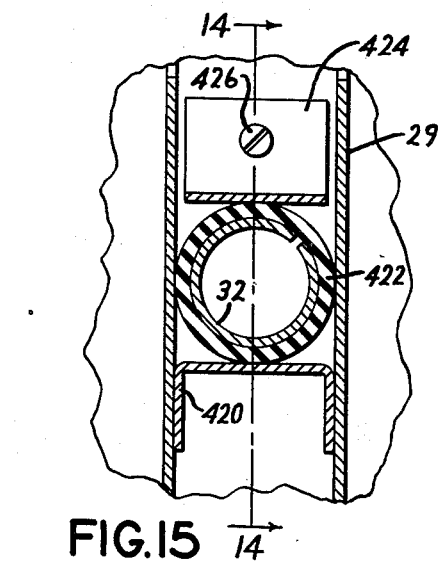

Aug. 21, 1956

C. F. ABRESCH 2,759,347

DOMESTIC APPLIANCE

Filed Dec. 23, 1950

| | CIRCUITS | | 5 | 10 | 15 | 20 | 25 | 30 | 35 | 40 | 45 |
|---|---|---|---|---|---|---|---|---|---|---|---|
| 1 | HOT FILL SOL. | | | | | | | | | | |
| 2 | COLD FILL SOL. | | | | | | | | | | | |
| 3 | DRAIN SOL. | | | | | | | | | | | |
| 4 | VAC. BREAK SOL. | | | | | | | | | | | |
| 5 | INDEX SOL. | | | | | | | | | | | |
| 6 | TIMER MOTOR | | | | | | | | | | | |
| 7 | WASHING MOTOR | | | | | | | | | | | |

INVENTOR.

Carol F. Abresch

BY

Willits, Hardman and Fehr

Attorneys

United States Patent Office 2,759,347
Patented Aug. 21, 1956

2,759,347

DOMESTIC APPLIANCE

Carel F. Abresch, Dayton, Ohio, assignor to General Motors Corporation, Dayton, Ohio, a corporation of Delaware Application December 23, 1950, Serial No. 202,471

5 Claims. (Cl. 68—21)

This application is a continuation in part of my copending applications S. N. 34,038 (now abandoned), S. N. 79,226 which issued on December 29, 1953, as Patent No. 2,664,050, S. N. 118,316 and S. N. 126,159 which issued on May 26, 1953, as Patent No. 2,639,600. Serial No. 118,316 has been issued as Patent 2,587,080 on February 26, 1952.

This invention relates to a domestic appliance and more particularly to washing machines having a single rotatable container in which washing takes place by agitating the clothes in the washing liquid and extraction is performed by evacuation of liquid from this container.

It is an object of my invention to provide a simple, inexpensive, reliable, durable, rotatable support for the rotatable container in a rotatable type of washing machine.

It is another object of my invention to provide a simple, inexpensive, reliable means for adequate venting a clothes washing container which is evacuated for extracting the washing liquid and drying the clothes.

It is another object of my invention to provide a simple, inexpensive, reliable means for positively opening a vent in a clothes washing container during the liquid filling operation and also following evacuation of the liquid from the container.

It is another object of my invention to provide a simple, inexpensive, reliable means for stopping the rotation of the rotatable clothes washing container at a predetermined angular position.

It is another object of my invention to de-energize the driving motor when the rotatable position of the clothes washing container is a predetermined angle of rotation in advance of the position at which the clothes washing contained is latched in the customary stopping position.

It is another object of my invention to combine the motor de-energizing control with the resilient latching of the rotatable clothes washing container in such a way as to result in a simple, inexpensive effective control.

It is another object of my invention to provide a washing machine in which a pump and the clothes washing container are connected for simultaneous continuous unidirectional rotation straight through the filling agitation and liquid extracting periods.

Generically these objects are attained by providing a rotatable spherical shaped clothes washing container with a resilient flexible wall and an inwardly directed agitator blade. The driving motor simultaneously rotates both the spherical container upon an inclined axis and a centrifugal pump having its outlet connected with a nozzle of a jet pump. Connected in series with the centrifugal pump and the nozzle of the jet pump in a loop circuit is a centrifugal separator. The vacuum chamber of the jet pump is connected through a hollow shaft with the interior of the spherical clothes washing container. The container is provided with a spring closed venting check valve which is opened by a solenoid during each liquid fill and subsequent agitation period and after each extracting operation. A stopping solenoid is coordinated with the rotation of the spherical container so that the driving motor is de-energized and the rotation subsequently is stopped by the subsequent engagement of a notch with a resilient notch engaging finger to stop the rotation of the spherical container with the access door in registration with the access opening in the surrounding cabinet.

Further objects and advantages of the present invention will be apparent from the following description, reference being had to the accompanying drawings, wherein a preferred form of the present invention is clearly shown.

In the drawings:

Fig. 2 is a rear view of the washing machine shown in Fig. 1 with portions of the rear panel broken away to show various elements;

Fig. 3 is a top view of the washing machine shown in Fig. 1 with the top removed;

Fig. 4 is a diagrammatic view of the container and the liquid filling and extracting system;

Fig. 5 is a sectional view taken along the line 5—5 of Fig. 4;

Fig. 6 is a fragmentary view of the upper bearing support of the washing machine including the solenoid operated check valve and the stopping mechanism;

Fig. 7 is a sectional view taken along the line 7—7 of Fig. 6;

Fig. 8 is a diagrammatic view of the stopping system as it is while the driving motor is driving in normal operation;

Fig. 9 is a diagrammatic view of the stopping system showing the first step in the stopping procedure;

Fig. 10 is a view similar to Fig. 8 showing the stopping system in the normal stopping position;

Fig. 11 is a fragmentary vertical sectional view showing the construction and arrangement of the sealing door upon the clothes washing container and the door in the top of the outer cabinet shell;

Fig. 12 is a fragmentary sectional view showing the latch and latch lever of the door of the clothes washing container in the latched position;

Fig. 13 is a fragmentary sectional view showing the latch of the door of the clothes washing container in the open position;

Fig. 14 is a fragmentary sectional view taken along the line 14—14 of Fig. 15 showing the resilient mounting provided at the ends of the transverse bearing support member;

Fig. 15 is a fragmentary sectional view taken along the line 15—15 of Fig. 14;

Figure 1:
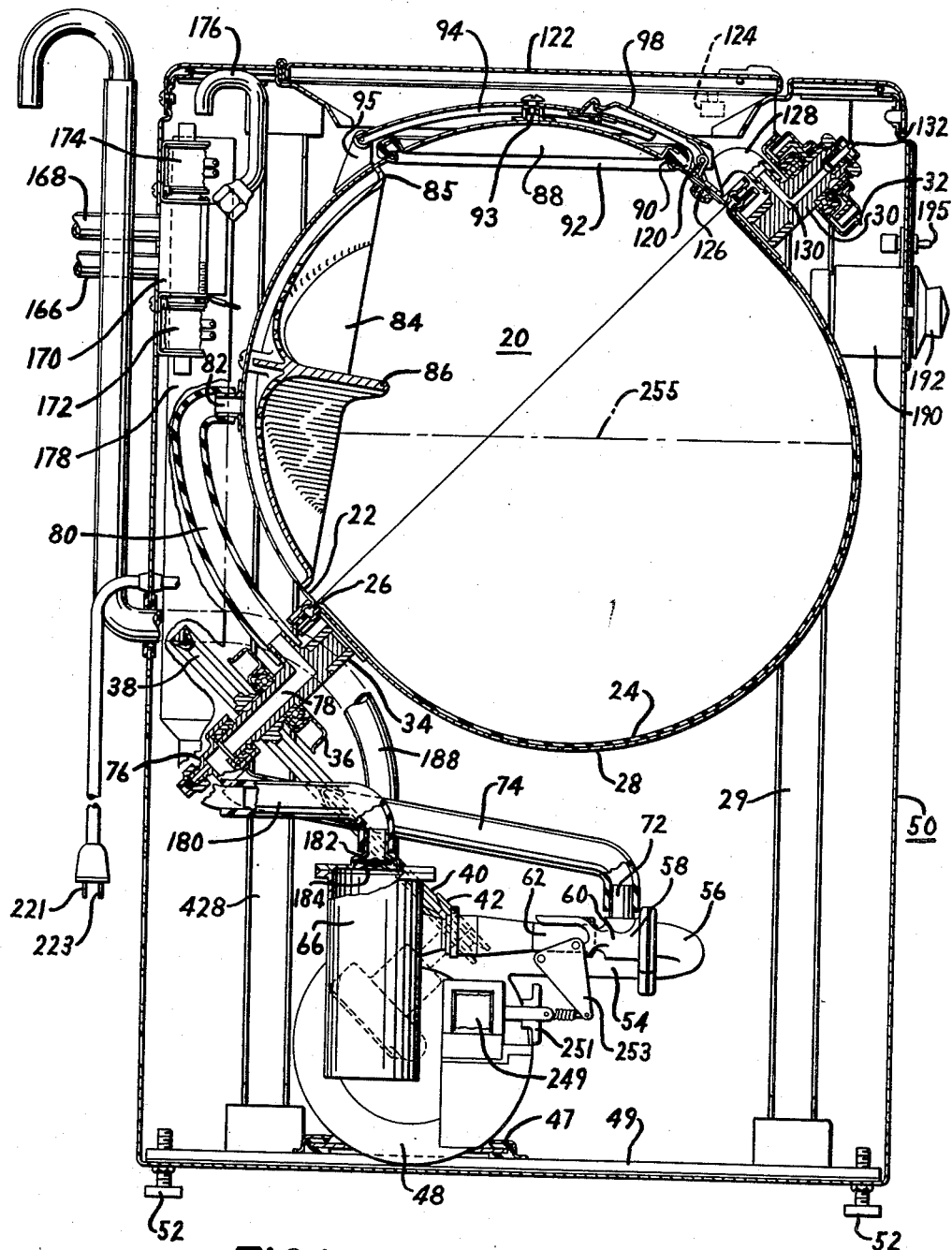
Fig. 1 is a vertical sectional view of a washing machine illustrating a preferred form of my invention.

Referring now to the drawings and more particularly to Fig. 1, there is shown a substantially spherical washing container 20 formed of a substantially hemispherical sheet metal portion 22 and a substantial hemispherical flexible elastic rubber diaphragm member 24. This diaphragm member 24 has a flange 26 which is clamped between the flange of the hemispherical portion 22 and the flange of a perforated substantially hemispherical sheet metal portion 28 which limits the outward movement of the diaphragm member 24. The perforated hemispherical sheet metal portion 28 is slightly elongated and is provided with an upper stub shaft 30 rotatably mounted in an upper ball bearing 31 in turn mounted within a rubber mounting 33 which is held within a flanged opening in the upper transverse bearing support member 32 as is better shown in Fig. 7. The perforated hemispherical sheet metal portion 28 is provided with a lower hollow stub shaft 34 rotatably mounted in a lower ball bearing also mounted in a rubber mounting within a flanged aperture in the lower transverse bearing support 36. The upper and lower stub shafts 30 and 34 are aligned on a diagonal axis of about 45° and their bearing mountings are similar.

The upper bearing support 32 extends between the vertical channel members 29 on opposite sides of the cabinet. Each of the channel members 29 are provided with a U-shaped bracket support 420 within the U-shaped configuration of the channel members 29. Both ends of the bearing support member 32 are formed to a cylindrical end and each enclosed within a cup shaped member 422 of synthetic rubber which fits against the web of the adjacent channel member 29 and rests upon the U-shaped bracket 420. A removable L-shaped bracket 424 is fastened in place by a screw 426 to normally hold the rubber cup member 422 and the adjacent end of the bearing support member 32 properly confined in place. The lower bearing support member 36 is provided with a similar rubber mounting between the second set of vertical channel members 428. This provides a sufficiently flexible bearing support for the suitable shafts 30 and 34 to prevent any binding of the bearings due to any reasonable misalignment of the shafts. It also provides an inexpensive, quiet mounting for the rotatable clothes washing container 20. This resilient mounting of the bearings is important since the stub shafts are fastened to the substantially hemispherically perforated member 28 which is formed by some sort of metal forming operation which in its nature cannot be done with extreme accuracy.

Immediately beneath the bearing support 36 the lower stub shaft 34 has fixed thereto a grooved pulley 38. This grooved pulley 38 is connected by a V-belt 40 to a small grooved pulley 42 fixed to the end of the shaft of a worm wheel within the worm wheel casing 44 mounted upon one end of the driving motor 46. The driving motor 46 drives a worm within the bottom of the worm wheel casing 44. The worm is in engagement with the worm wheel which drives the pulley 42.

The motor 46 is supported upon a resilient mounting 47 which includes synthetic rubber members for preventing metallic transmission of noise and vibration to the remainder of the washing machine. This resilient mounting 47 is provided upon a transverse cross member 49 which extends across the bottom of the cabinet 50 from the front to the rear thereof. The cabinet 50 includes a sheet metal member extending around the front and sides of the cabinet, the ends of which are joined by the sheet metal member extending across the rear of the cabinet. The bottom of the cabinet is provided with adjustable screw threaded legs 52.

The motor 46 is double ended and its opposite end is directly connected to a centrifugal pump 48. As is best shown in Figs. 1 and 4, the outlet 54 of the centrifugal pump 48 is connected by a 180° connection 56 with the nozzle 58 of a jet or venturi pump 60. The outlet of this jet or venturi pump 60 is connected by a flexible rubber hose 62 with the upper tangential inlet 64 of a closed centrifugal liquid and gas separator 66. This separator 66 is in the form of a cylindrical container and has a lower tangential outlet 68 connected by a rubber hose 70 with the centrally located inlet of the centrifugal pump 48.

The vacuum chamber or vacuum inlet 72 is connected by a flexible rubber hose 74 with a fitting 76 which is rotatably connected to the lower end of the stub shaft 34. The stub shaft 34 is provided with a coaxially located passage 78 connecting directly with the passage in the fitting 76 which connects with the rubber hose 74. The stub shaft 34 is provided with a connection fitting located upon the opposite side of the bearing support 36 from the pulley 38 which connects with a molded rubber hose 80 which in turn connects to an inlet and outlet fitting 82 upon the substantially hemispherical member 22 of the clothes washing container 20.

At one side within the container 20 there is fastened an agitator member 84 in the shape of a portion of a sphere having a rim 85 which curls outwardly into contact with the member 22. This agitator member 84 may be of metal or some suitable thermosetting plastic. The central portion is perforated so as to permit free flow of liquid and gas from and to the fitting 82. The agitator member 84 includes an inwardly projecting blade 86 extending at an angle of about 45° to the axis of the stub shafts 30 and 34. This blade has a straight portion in the form of a chord of a segment of the sphere nearest the stub shaft 34 and a humped portion in the half furtherest from the stub shaft 34.

In the top of the clothes washing container 20, as shown in Fig. 1, the container is provided with a sheet metal door 88 having its rim provided with a rubber sealing gasket 90 for making sealing contact with the roller rim 92 provided in the adjacent portion of the substantially hemispherical member 22. The door 88 is universally rockably connected by a universal full floating connection 93 to a lever 94 which is pivotally connected to the hinge member 95 mounted upon the member 22. The pivoted member 94 is provided with a pivoted spring pressed catch member 96 which is adapted to catch and hold the pivoted latch lever 98. This pivoted latch lever 98 is provided with a spring 120 which resiliently edges the latch lever 98 in the counterclockwise direction so that when it is released, it moves to the position shown in Fig. 11. This makes a simple safety arrangement which prevents the closing of the pivoted lid 122, as shown in Fig. 11, since the latch lever 98 in this released position prevents the lid 122 from being fully closed. The lid 122 cooperates with a lid switch 124 which is moved to closed position by the complete closing of the lid 122 and which is spring operated to the open position whenever the lid 122 is not fully closed. As will be further explained in connection with the wiring diagram, the opening of this lid switch 124 will prevent the operation of the driving motor 46. This insures that the clothes washing container 20 cannot be rotated until the door 88 is latched closed.

The substantially hemispherical member 22 is provided with an outlet vent 126 immediately adjacent the spring 120. This outlet vent 126 is connected by a rubber hose 128 which connects with a vent passage 130 in the upper stub shaft 30. As is better shown in Fig. 7, the upper end of this stub shaft 30 is provided with a spring pressed valve member 132 provided with a valve head adapted to close the outer end of the vent passage 130 in the stub shaft 30. For this purpose, there is provided a compression type coil spring 134. The stem of the valve member 132 is slidably mounted in a perforated venting cap nut 133. The outer end of the stem of the valve member 132 is provided with an angular notch which receives the forked outer end of an operating lever 136 having its opposite end connected to the armature 138 of a solenoid 140 mounted upon an adjacent portion of the bearing support 32. When the solenoid 140 is energized, the lever 136 is turned counterclockwise to open the valve member 132 to permit the free venting of gas and vapor from the interior of the rotatable washing container 20. At the end of the extracting period, the solenoid 140 is also energized to permit air to enter into the container 20 to break the vacuum therein so as to allow the rubber diaphragm member 24 to return to its normal position in contact with the perforated member 28.

A round flanged sheet metal member 142 is rotatably mounted upon the outer end of the stub shaft 30. This member 142 is connected by a torsion type coil spring 144 with a second round flanged heavy sheet metal member 146 which is fixed to the outer end of the stub shaft 30. A projection 145 extends upwardly from the member 146 into the arcuate slot 143 and the coil spring normally urges the member 142 in the clockwise direction as viewed in Fig. 6 so that the end of the slot bearing the reference character 143 normally bears against the projection 145. This normally keeps the members 142 and 145 oriented as shown in Fig. 8. The flanges of the members 142 and 146 are arranged one within the other. As shown in Figs. 8 to 10, the member 142 is provided with a wide notch 148 in its flange while the member 146 is provided with a notch 150 about half the width of the notch 148. Cooperating with the flanges of the members 142 and 146 and with their notches 148 and 150 is a pivotally mounted feeler member 152 which is pivoted by the pin 154 to the upper bearing support 32. This feeler member 152 includes a spring pressed plunger 156. The feeler member 152 is connected by an arm 158 and a pin with the armature 160 of a solenoid 162. This feeler member 152 is urged into contact with the flanges of the members 142 and 146 by a small coil spring 153 which bears upon the adjacent end of the arm 158. This solenoid 162 is also provided with a switch mechanism 164 likewise connected to and operated by the armature 160 as well as the feeler member 152 with which it is also connected. To stop the operation of the motor 46 and the centrifugal pump 48 and the rotation of the container 20, the solenoid 162 is de-energized. This places the spring pressed plunger 156 of the feeler member 152 in the dotted line position shown in Fig. 8 in contact with the flange 142. This contact of the feeler member 152 with the flange 142 limits the movement of the armature 160 and this limited movement permit is not sufficient to move the switch 164 to the open circuit position. When the notch 148 is rotated to the position where it will receive the spring pressed plunger 156 of the feeler member 152, it will enter the notch 148 and move into contact with the flange of the member 146. This further movement of the armature 160 will cause the opening of the switch 164 thereby de-energizing the motor 46 in a particular angular rotational position of the notch 148. This will stop the rotation of the member 142 and wind up the spring 144. The spring 144 slows down the rotation of the container 20 but the inertia of the moving parts is sufficient to cause the container 20 and the pump 48 and the motor 46 to continue rotating until the spring pressed plunger 156 engages the notch 150 and the flange 146. The shock caused by the engagement of the spring pressed plunger 156 when it is engaged by the flange 146 as shown in Fig. 10 is prevented by the spring 157 clearly shown within the plunger in dotted lines in Fig. 6. The plunger 156 and the spring 157 will retract to relieve the shock and will stop the rotation of the container with the lid 88 in its uppermost position directly beneath and in registration with the lid 122.

Hot and cold water are fed to the washing machine through the hot and cold water passages 166 and 168. These pipes 166 and 168 connect with the valve chamber 170. A measuring system of the general type shown in the Clark Patent 2,366,236 is used to measure the amount of hot and cold water delivered to the container 20. The flow of water into the valve chamber 170 from the pipe 166 is controlled by a solenoid operated valve 172 while the flow of water from the cold water pipe into the mixing chamber 170 is controlled by the solenoid operated valve 174. Water is discharged from the mixing chamber 170 through a spout 176 which discharges the mixed water into a vertical well 178 which extends nearly to the top of the spherical container 20. The bottom of the well 178 is connected by a flexible rubber hose 180 with an inlet fitting 182 in the top of the tangential cylindrical separator 66. The fitting 182 is provided with a dual flapper type of check valve 184 which opens downwardly so as to allow water in the well to flow freely into the separator. The check valve 184 however will prevent air and water from flowing from the separating chamber 66 up into the vertical well 178. The centrifugal separator 66 is provided with an outlet fitting 186 which is connected with the discharge hose 188.

Figures 16, 17:
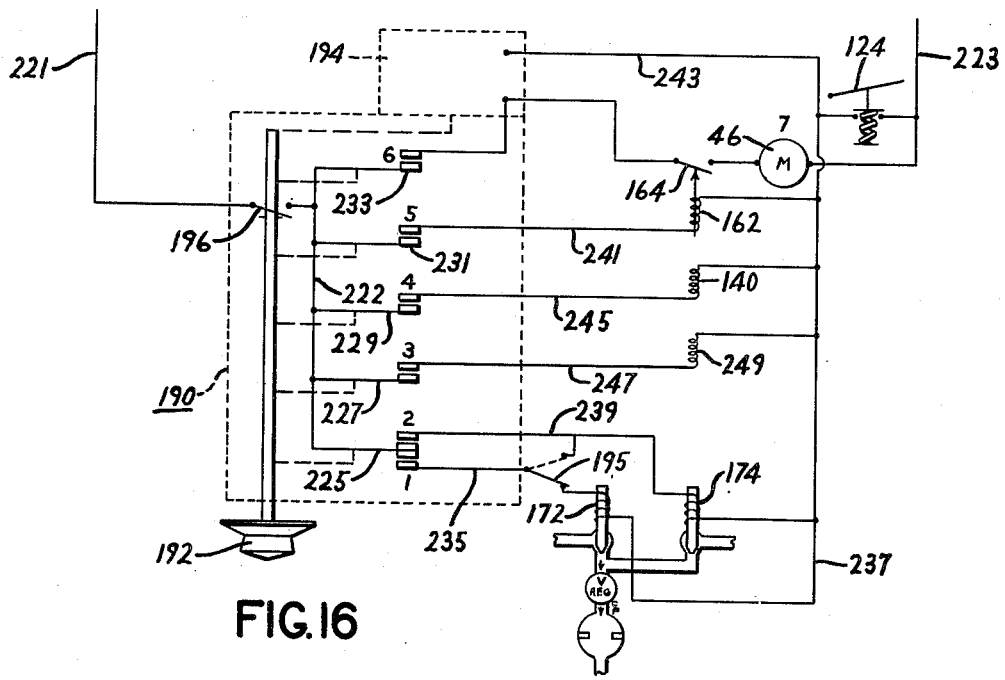
Fig. 16 is the wiring diagram for the washing machine.
Fig. 17 is a circuit chart showing the times at which the various circuits are energized and de-energized.

The front of the cabinet 50 is provided with a clock type timing switch means 190 which includes a manually controllable dial knob 192. A hot and cold water switch 195 is also provided upon the front of the cabinet. Referring now more particularly to Fig. 16, there is shown diagrammatically the timing switch means 190 adapted to be manually controlled by the knob 192 and driven by the timer motor 194. To begin washing, the lid 122 and the door 88 are opened and a suitable amount of clothes together with a suitable amount of soap or detergent are placed within the interior of the container 20. A switch 196 is manually closed by pushing the knob 192 in to effectively connect the electrical circuit of the washing machine to the supply conductors 221 and 223. The switch 196 connects the supply conductor 221 with the bus bar 222 having connected thereto a movable cam operated contact 225 which cooperates with the stationary contacts 1 and 2. Also connected to the switch 196 is the movable cam operated contact 227 which connects with the stationary contact 3 while the movable cam operated contact 229 is adapted to engage with and be disconnected from the stationary contact 4. The movable cam operated contact 231 is adapted to engage and be disengaged from the stationary contact 5 while the movable cam operated contact 233 is adapted to engage and be disengaged from the stationary contact 6. The movable contacts 225, 227, 229, 231 and 233 are operated by individual rotatable cams rotated at a timed rate by the timer motor 194.

The movable contacts make a closed circuit with the stationary contacts 1 to 6 inclusive in accordance with the circuit chart shown in Fig. 17. In this chart, the heavy black lines indicate the time during which the respective stationary contacts are engaged by their respective movable contacts. The white spaces indicate the time at which these switch elements are in the open circuit position. The stationary contact 1 is connected by the conductor 235 with the hot and cold water switch 195. The switch 195 in the full line position shown in Fig. 16 connects with the hot water solenoid valve 172 which in turn is connected by the conductor 237 with the lid operated switch 124 which in turn connects to the supply conductor 223. The stationary contact 2 is connected by the conductor 239 with the cold solenoid valve 174 which in turn connects to the conductor 237. When the switch 195 is moved to the dotted line position, as shown in Fig. 16, it connects the stationary contact 1 and the conductor 235 with the conductor 239 and the cold water solenoid valve 174 which in turn connects to the conductor 237. This provides a choice of temperatures for the initial filling of the tub.

When the hot water solenoid 172 is thus energized, the hot water will flow for a period of time to substantially fill the vertical well 178. At the same time the motor 46 is placed in operation by the turning of the knob 192 to the starting position which causes the contact 233 to engage the contact 6. At the same time, the contact 231 is moved by its rotatable cam into engagement with the stationary contact 5 which is connected by the conductor 241 with the index solenoid 162 which energized to close the index switch 164 to energize the main motor 46 soon after the timer motor 194 has been energized. The timer motor 194 is connected by the conductor 243 with the conductor 237 so that the timer motor 194 is also under control of the lid switch 124.

The stationary contact 4 is connected by the conductor 245 with the solenoid 140 which in turn is connected to the conductor 237 so that it is likewise under control of the lid switch 124. The solenoid 140 is termed the vacuum breaker solenoid and is listed under line 4 in Fig. 17. As shown, this solenoid 140 is energized during each filling and agitating or rinsing period and also following the final extraction.

The stationary contact 3 is connected by the conductor 247 with a drain solenoid 249 which in turn is connected to the conductor 237 and therefore is also under the control of the lid switch 124 as well as the movable contact 227. When energized, the drain solenoid does not cause draining of the container 20 but its armature 251 is connected to a lever member 253 which operates to squeeze the tubing 62 at the outlet of the jet or venturi pump 58 so that the water being pumped by the centrifugal pump 48 will be forced through the vacuum connection 72, the hose 74, the fitting 76, the passage 78, the hose 80 and the fitting 82 into the interior of the container 20. This will take place as long as there is any water in the well 178. Sufficient water however will be retained by the centrifugal pump 48 and the loop circuit which includes the outlet 54, the connection 56, the jet pump 58, the rubber hose 62 and the separator 66 to maintain liquid in circulation through the loop circuit sufficient to keep the pump 48 primed.

This pumping system is of particular advantage in this particular application. When all of the water has been removed from the well 178 by the loop circuit pumping system, the system will not deliver any appreciable amount of air or other additional fluid to the interior of the container 20. If air were delivered after the filling of the container 20, froth and foam would be discharged through the vent 126, the connection 128, the vent passage 130 and out past the valve member 132. This froth would fill the interior of the cabinet 50 and be obviously objectionable. The hot and cold water solenoids 172 and 174 are so timed by the cam operated switch 225 under its operation by the timer motor 194 that the initial filling brings the water level up to the dot and dash line 255 which is about the midpoint of the container 20. The rinse fills may be slightly less than this amount.

The container 20 is rotated continuously throughout all operations since it is connected through the pulleys and belt at all times with the driving motor 46 which drives the centrifugal pump 48. The clothes in the washing liquid in the container 20 are agitated by the movement of the agitator blade 86 through the pool of washing fluid 255 within the container 20. The agitator blade 86, since it is located at an angle of 45° to the axis of rotation of the container 20 provides a particular efficient form of agitation which cleanses and rinses the clothes without tangling. The 45° angle and the particular shape of the agitator blade 86 permits the clothes to slip off the blade in case they should be engaged by the blade without being twisted or wrapped up. The container 20 is rotated about one revolution per second. This particular speed and the diagonal axis of rotation keeps the clothes in the washing solution in the container and does not allow the clothes to be carried up the smooth walls of the container 20 by centrifugal action.

To extract the washing liquid from the container 20 and the clothes, the drain solenoid 249 is de-energized to open the hose connection 62 and to cause the jet pump or venturi 58 to draw the washing liquid and vapor from the container 20 and the clothes therein. The external or environment air will pass through the perforations in the hemispherical member 28 to collapse the flexible rubber diaphragm 24 to apply pressure to the clothes in the container 20 to assist in the extraction of liquid and vapor from the container 20. As shown by the chart, the vacuum breaker solenoid 140 will be de-energized at this time so that the valve 132 will be in the closed position. The fitting 82 is located in an orbit so that when the container 20 is rotated 180° from the position shown in Fig. 1, the fitting 82 will be at the extreme bottom of the container 20 so that complete drainage of the container 20 is made possible. The agitator member 84 is preferably provided with a catch basin between it and the adjacent portion of the hemispherical member 22 which will trap residual amounts of liquid as the container 20 is rotated to assist in conducting the residual amounts of liquid to the fitting 82 and the hose 80 during extraction.

This evacuating method of extracting efficiently removes the washing liquid and the rinse liquid from the clothes without imposing any strains upon the clothes sufficient to cause any form of breaking or tearing. After the final extracting operation, the vacuum breaking sole- noid 140 is again energized to permit air to enter the container 20 through the passage 130, the connection 128 and the vent opening 126 to allow the diaphragm 24 to assume its extended position as shown in Fig. 1 so that the clothes may be readily removed after they have been washed and dried by evacuation.

While the form of embodiment of the invention as herein disclosed, constitutes a preferred form, it is to be understood that other forms might be adopted, as may come within the scope of the claims which follow.

What is claimed is as follows:

1. A washing machine including a clothes washing container adapted to contain a washing fluid, said container being provided with a flexible elastic wall portion, a single pumping means for pumping fluid into the container and for removing fluid from the container, valve means for opening said container to the environment, and control means having one control condition for simultaneously operating said pumping means to remove fluid from the container and also closing said valve means and having a second control condition for simultaneously pumping fluid into the container and also opening said valve means.

2. A washing machine including a clothes washing container adapted to contain a washing fluid, said container being provided with a flexible elastic wall portion, pumping means for pumping fluid into the container and for removing fluid from the container, valve means for opening said container to the environment, and timing control means for controlling said pumping means to pump fluid into said container and simultaneously open said valve means during one period of time and for controlling said pumping means to pump fluid out of said container and simultaneously close said valve means during a succeeding period of time and for opening said valve means during a following period of time and for stopping the operation of said pumping means during this last mentioned opening of said valve means.

3. A washing machine including a clothes washing container adapted to contain a washing fluid, said container being provided with a flexible elastic wall portion, pumping means for pumping fluid into the container and for removing fluid from the container, valve means for opening said container to the environment, and control means having one control condition for simultaneously starting the operation of and operating said pumping means to remove fluid from the container and also closing and keeping closed said valve means during said operation and having a second control condition for simultaneously beginning pumping and pumping fluid into the container and also opening and keeping open said valve means, said control means also having a third condition effective at the termination of each completed washing for opening and keeping open said valve means substantially at the end of the removal operation of the pumping means to remove fluid from the container.

4. A washing machine including a clothes washing container adapted to contain a washing fluid, said container being provided with a flexible elastic wall portion, bearing means for movably supporting said container, means for moving said container on said bearing means, passage means extending through said bearing means connecting with the interior of said container, a valve seat provided upon said bearing means, said passage means extending to said valve seat, pumping means connecting with said passage means for pumping fluid into the container and pumping fluid from the container, and valve means cooperating with said valve seat for closing and opening said passage means to the environment.

5. A washing machine including a clothes washing container adapted to contain a washing fluid, said container being provided with a flexible elastic wall portion, bearing means for movably supporting said container, means for moving said container on said bearing means, an end of said bearing means being provided with a coaxially located valve seat, passage means extending through said bearing means connecting with the interior of said container and with said valve seat, means for delivering fluid to said container, pumping means connecting with said passage means for pumping fluid from the container, and valve means coaxially located relative to said bearing means for closing and opening said passage means to the environment.

References Cited in the file of this patent

UNITED STATES PATENTS

| | | |
|---|---|---|
| 1,718,191 | Couch | June 18, 1929 |
| 1,935,212 | Levy et al. | Nov. 14, 1933 |
| 1,966,213 | Oelmann | July 10, 1934 |
| 2,472,682 | Rand | June 7, 1949 |
| 2,535,226 | Oliver | Dec. 26, 1950 |